United States Patent

[11] 3,607,225

| [72] | Inventors | Ovidiu Hatarescu;<br>Iosif Tripsa; Gheorghe Atanasiu, all of<br>Bucharest, Romania |
|---|---|---|
| [21] | Appl. No. | 797,366 |
| [22] | Filed | Jan. 28, 1969<br>Continuation of Ser. No. 557,556,<br>June 14, 1966, abandoned |
| [45] | Patented | Sept. 21, 1971 |
| [73] | Assignee | Institutul De Cercetari Metalurgice<br>Bucharest, Romania |
| [32] | Priority | June 22, 1965 |
| [33] | | Romania |
| [31] | | 49,907 |

[54] PROCESS AND APPARATUS FOR THE DIRECT REDUCTION OF IRON ORES
3 Claims, 3 Drawing Figs.

[52] U.S. Cl. .................................................. 75/35,
75/90, 266/13, 266/14, 266/17
[51] Int. Cl. ....................................................... C21b 13/02
[50] Field of Search ............................................ 75/26, 34,
36, 35, 90; 48/196; 266/13, 14, 17

[56] References Cited
UNITED STATES PATENTS

| 2,846,296 | 8/1958 | Hasche ......................... | 48/196 |
| 2,921,845 | 1/1960 | Kyle et al. ..................... | 48/214 |
| 3,375,098 | 3/1968 | Marshall ....................... | 75/35 |

Primary Examiner—L. Dewayne Rutledge
Assistant Examiner—J. Davis
Attorney—Karl F. Ross ABSTRACT: Apparatus and process for reducing iron ore and making sponge iron therefrom wherein a reduction column is formed by charging a vertical shaft furnace with iron-oxide ore and about 5 percent coke in lump form. The iron ore of the column is reduced at a temperature of 800°–850° C. by a reducing gas mixture consisting essentially of 40 to 50 percent by volume hydrogen, 35 to 45 percent by volume carbon monoxide, 2 to 10 percent by volume nitrogen, 3 to 5 percent by volume methane, 2 to 5 percent by volume carbon dioxide and 2 to 4 percent by volume $H_2O$. Thereafter the hot outlet gas is recovered, combined with a quantity of methane such that the methane in the resulting gas mixture is stoichiometrically equal to the quantity necessary to convert all of the carbon dioxide and $H_2O$ of said outlet gas into carbon monoxide and hydrogen, and reformed by passing it successively through a previously heated regenerator zone thereof to 700 to 900° C, through a nickel-catalyst zone adapted to convert substantially all but a maximum of 4 percent by volume methane of said gas mixture into carbon monoxide and hydrogen by reaction with the carbon dioxide and $H_2O$ of the gas mixture, and through a preheated regenerator zone to raise the temperature of the reformed gas mixture to 800 to 850° C. The sponge iron is recovered along with the major part of the coke added to said column with said charge.

PATENTED SEP 21 1971 3,607,225
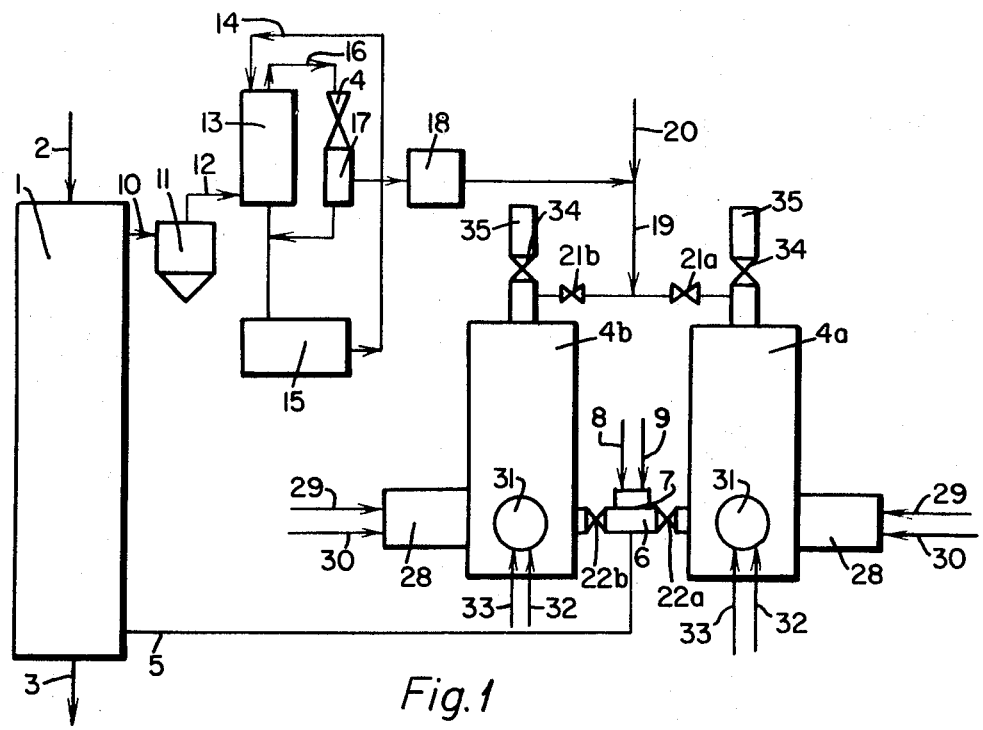
Fig. 1
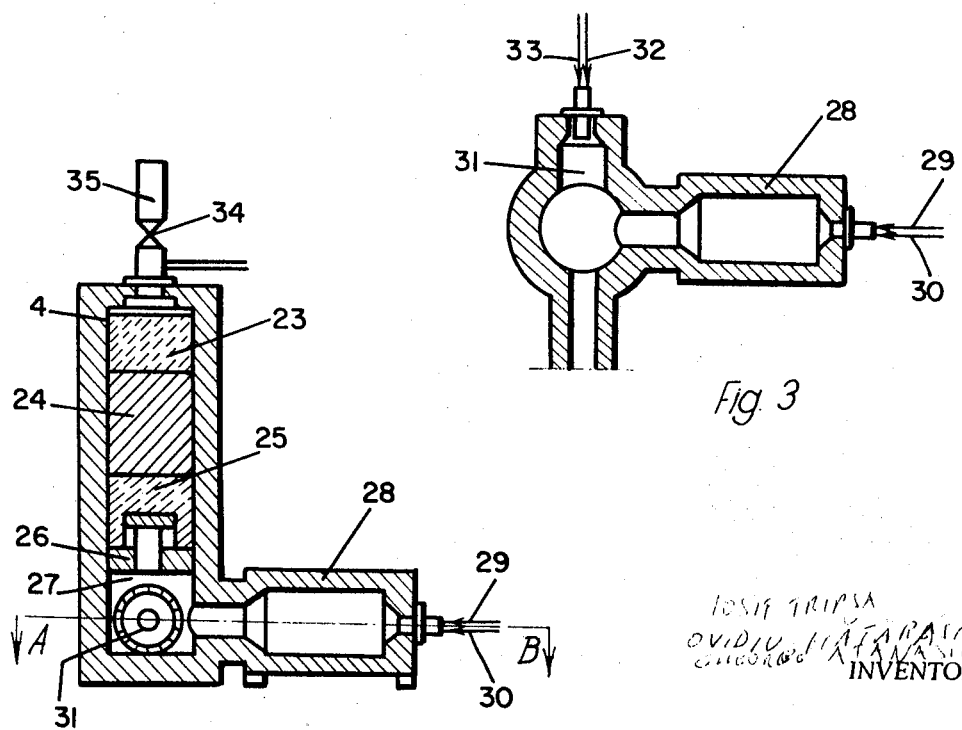
Fig. 2
Fig. 3
IOSIF TRIPSA
OVIDIU ATANASIU
GHEORGHE ATANASIU
INVENTORS
BY

PROCESS AND APPARATUS FOR THE DIRECT REDUCTION OF IRON ORES

This is a Continuation of Ser. No. 557,556, filed June 14, 1966, now abandoned.

The present invention concerns a process and a apparatus for the direct reduction of iron ores by gaseous agents resulting from the catalytic conversion of methane.

Several processes are known for the direct extraction of iron from ores, these methods attempting to replace the blast-furnace reduction method which uses as the reducing agent relatively scarce metallurgical coke.

According to one of these known processes, lumps or pellets of the ore are fed countercurrent with the reducing gases, through a vertical shaft furnace, the ore being fed from the top of the furnace, while the reducing gas, obtained by the conversion of methane in an associated plant, enters at the lower part of the furnace. Part of the gases employed in the process serve to heat the regenerate furnace, when the latter is in the heating phase, while the balance is recycled, the amount of gases recycled varies between 25 and 65 percent, depending upon the oxidizing agent employed for converting the methane. When water vapor is employed as an oxidizing agent, 25 percent of the recovered gases are recycled to the upper part of the reduction furnace, the percentage being of about 65 percent when the oxidizing agent is pure oxygen. Thus, a mixture of reducing gases is obtained at a relatively high temperature (above 1000° C.), and of high carbon content (in the form of carbon black), which deposits on the ore inside the furnace in the last reducing phase. The presence of carbon, as carbon black, in the mixture of reducing gases, is in many cases undesirable, and may constitute an impediment, when the aim is to get an iron sponge of high reducing power, but exempt of carbon. Due to the fact that this procedure requires the methane decomposition to be achieved either by means of oxygen, or by water vapor, the mixture of reducing gases is obtained at temperatures varying between wide limits, a fact which makes control of the reducing process difficult and leads to nonuniform iron sponge composition.

It may be seen that the recycling of the reducing gases in such limited proportions is uneconomical when one considers that, upon leaving the reducing furnaces, these gases always contain more than 50% carbon monoxide and hydrogen. On the other hand, directing a methane conversion process towards a high degree of transformation the mixture of reducing gases is to be maintained at very high temperatures between 1,300° and 1,400° C., thereby causing the blocking of the ore column.

According to another known procedure, the iron ores, lumps or pellets, are reduced in a vertical shaft kiln, with a mixture of reducing gas obtained from methane, a process similar to that mentioned with the difference that the proportion of reducing gas employed which is recycled is about two thirds; the gas to be recycled is extracted from the furnace at the upper end of its active zone, while the balance of one third of the recovered gas is employed for preheating the ores, at the upper part of the reducing kiln.

The utilization of part of the reducing gases for preheating the charge is in fact an uneconomical utilization of the available reducing agent since, for this purpose, a fuel of lower heat value would have been sufficient. This drawback is further complicated by the fact that control of preheating in the upper part of the kiln is very difficult, so that the operation is practically uncontrollable, and local preheating, which inherently occurs, often results in blocking the charge. At the same time, the air blown into the furnace for the combustion of the ore-preheating gas, is often detrimental to the composition of the recycling gas by the addition of nitrogen thereto.

It is, therefore, the principal object of the present invention to provide an improved process and apparatus for the economical reduction of iron ores.

The process for the direct reduction of iron ores according to he invention eliminates the above drawbacks, by employing for the purpose of complete utilization of the reducing agents resulting in the process and of eliminating the possible causes of charge blocking in the kiln, a charge composed of iron ore in the form of lumps and 5 percent (by volume) of lumps of coke most of which is recovered after reduction; we employ for this purpose of mixture of gases, obtained by the integral recycling of the gas recovered at the upper part of the furnace, the composition of which is regenerated by the addition of methane in amounts strictly corresponding to that stoichiometrically required by the carbon dioxide and water vapor contents remaining in the recycling gas (to reform them completely into hydrogen and carbon monoxide), while the conversion of methane is performed at 700° - 900° C by passing the gas mixture over a methane-conversion catalyst in a regenerative furnace.

The apparatus for the direction reduction of iron ores, according to the invention, consisting of a vertical shaft furnace and of devices for purifying, conveying and feeding the gaseous agents, in addition to two regeneratively heated furnaces (working alternately in the heating and the regenerating phase) which—for the purpose of preheating the mixture of recycled gases and of methane, and for converting the freshly added methane to regenerate the recycling gas, as well as for adequately heating the regenerated mixture of reducing gas to enable its utilization in the reduction furnace—are provided at their lower parts with two intermittently operating hearths, of which the first works only during the heating phase, burning methane or any other gaseous fuel with air addition; the second hearth, working only during the regenerating phase, heats the reducing gas mixture to a temperature of 800 to 850° C before admitting it to the reducing furnace, this second hearth being heated by reaction between methane and oxygen, metered into the furnace within narrow limits of stoichiometry in order to result in CO and $H_2$. Inside each regenerating furnace, the zones ascribed to the enumerated purposes are as follows: 20 to 24 percent of the furnace height for hearth and grate, 18 to 22 percent of the furnace height for the lower layer of refractory material which accumulates heat for heating the regenerated mixture of reducing gases, 30 to 34 percent of the furnace height for the continuous layer of catalyst serving to convert the methane freshly added to the recycled gas, and 24 to 28 percent of the furnace height for the layer of refractory material serving as heat accumulator for preheating the mixture of recycles gases and of methane. For controlling the temperature of the gas mixture within narrow temperature limits, the apparatus includes another methane and oxygen burner, located at the point of entrance of the reducing gases to the reduction furnace.

The above and other objects, features and advantages of the present invention will be more readily apparent from the following description, reference being made to the accompanying drawing in which:

FIG. 1 is a diagram of a direct-reduction installation according to our invention;

FIG. 2 is a vertical cross section through the regeneration furnace; and

FIG. 2 is a vertical cross section through the regeneration furnace; and

FIG. 3 is a horizontal cross section through the regenerating furnace, along the line A—B of FIG. 2.

The direct-reduction apparatus for the present invention consists of a vertical shaft furnace 1 for reducing mineral ores, which are introduced into the furnace as a charge containing 5 percent coke, from the top, as shown by arrow 2, while the resulting iron sponge is discharged through the bottom by means of a mechanical evacuation device represented by arrow 3.

The reducing-gas mixture, alternately supplied by the regenerators 4a and 4b, enters the reduction furnace 1 at its foot, as shown by arrow 5, after having been previously brought to the operating temperature, which temperature is corrected in case of need in a burning chamber 6, in which the flame of an additional burner 7 penetrates, the burner being fed with methane as shown by arrow 8 and with technical-grade oxygen as shown by arrow 9, strictly metered in accordance with the stoichiometry required for formation of carbon oxide and hydrogen.

The reducing-gas mixture traverses the ore column in the reduction furnace 1, from the bottom up and in counterflow to the ore, modifying its composition, so that when leaving the top of the furnace, as shown by arrow 10, it has the following average composition (by volume): 15–20 percent $CO_2$, 25–35 percent CO, 30–40 percent $H_2$, max. 4 percent $CH_4$ and 3–15 percent $N_2$; this outlet gas is introduced into a cyclone 11 for dust removal, then, as indicated by arrow 12, the gas enters a scrubber 13 through its lower part, where the wet purification is carried out, the gas being concomitantly cooled off. In order to reduce the moisture content of the outlet gas mixture (introduced during the wet purification by water sprinkling), the excess water is collected for the purpose of recycling, as shown by the arrow 14, in a settling tank 15.

The cooled gases pass, as shown by arrow 16, through a Venturi purifier 17, wherefrom by means of a blower 18 they are fed in a pipe 19, to which the methane necessary for regeneration is also directed, as shown by arrow 20. From the mixing pipe 19, the recycled gas and methane is directed via the valves 21a or 21b, to the top of the regeneration furnace 4a or 4b, depending upon the one operating in the regeneration phase. In one of the regeneration furnaces 4a or 4b, namely that working in the regeneration phase, the methane of the gaseous mixture, together with the carbon dioxide and the water vapor contained in the recycling gas are reformed over the catalyst layer in the generator, while the regenerated gas enters the combustion chamber 6 through the valve 22a or 22b, and returned to the reducing shaft 1.

The creation of a balanced heat regime in view of the optimum conversion of the methane freshly brought in for regeneration purposes,—the conversion agents $CO_2$ and $H_2O$ being retained in the recycling gases corresponding to to the needs of completing the necessary volume of reduction gas for the normal activity of the reduction furnace—prescribes a severe dosing, both of the heat accumulating elements for the conversion and heating of the regenerated gases, and of the catalyzer necessary to the optimum activation of the conversion reaction, so that the number of active regenerating furnaces pertaining to the installation should be reduced to a minimum. In accordance with the above, and with the experimental results, the regenerating furnace 4a (or 4b) according to the invention, of cylindrical shape, is lined internally with refractory bricks; and comprises, from the top to the bottom, a layer 23 of refractory material in the form of grains occupying 24–28 percent of the space and having the function of a heat accumulator for preheating the mixture of recycled gas and of methane. Below this layer of refractory material there is a further layer 24, consisting of nickel catalysts which—in order to ensure the perfect conversion of the methane in the mixture to a percentage of unconverted methane of 4 percent—is located within a space occupying 30 to 34 percent of the total volume of the furnace, followed by a last layer 25 of heat registering material adapted to accumulate heat for heating the regenerated gas and occupying 18 to 22 percent of the inside of the furnace.

The three layers of charge are supported by a vault-shaped grid 26 of refractory bricks (FIG. 2), below which there is a combustion chamber 27, which occupies the balance of inner space of the regenerating furnace. To the combustion chamber 27, two side hearths (FIG. 3) are directly connected: one hearth 28 for burning methane or another gaseous fuel supplied as shown by the arrow 29 with air supplied as shown by the arrow 30, when the regenerator works in the heating phase; the other hearth 31 is for burning methane exclusively, the methane being shown by the arrow 32 while oxygen is supplied as shown by the arrow 33, when the reducing gases need additional heating, especially during the last period, when the regenerator is operated in the regenerating phase.

Each regenerating furnace 4a or 4b is provided at the top, with a valve 34 for the discharge of burnt gas through a chimney 35, the valve 34 being open only during the heating period.

While experimenting the process in a plant according to the invention, consisting essentially in a reducing furnace of $2.2m^3$ capacity, inclusive of the cooling zone of the furnace, and two generators each of $3.6m^3$ capacity, employing an iron ore (iron oxide) of 65 percent Fe content, the following results have been achieved:

| | |
|---|---|
| daily output of the plant | 1,900 kg. of iron sponge |
| methane flow for conversion | 20–25 m.³/hr. |
| reducing temperature | 750°–800° C. |
| specific consumption of technical-grade methane | 350 m.³/ton of sponge |
| specific consumption of methane for combustion | 400 m.³/ton of sponge |
| reduction degree | over 90% |
| chemical composition of the reducing gas (volumes) | max: 5% $CO_2$ 35–45% CO, 40–50% $H_2$ max: 5% $CH_4$ 2–10% $N_2$ |

The process according to the invention shows the following advantages: it ensures continuous processing without the danger that the ore column will be "hung up" and with a reduced specific consumption of methane; it generates the recycling gases; it produces a homogeneous iron sponge with a reduction degree of over 90 percent; and it affords the possibility of replacing the methane in heating the regenerating furnaces by another inferior gaseous fuel (blast furnace gas, etc.).

We claim:

1. A process for reducing iron ore and making sponge iron therefrom, comprising the steps of:
    a. forming a reduction column by charging a vertical shaft furnace with iron-oxide ore in lump form and about 5 percent coke;
    b. continuously reducing the iron ore of said column by passing upwardly therethrough from the bottom at a temperature at least upon introduction to the column, of 800° to 850° C., a reducing gas consisting essentially of 40 to 50 percent by volume hydrogen, 35 to 45 percent by volume carbon monoxide, 2 to 10 percent by volume nitrogen, up to 5 percent by volume methane, up to 5 percent by volume carbon dioxide and 2 to 10 percent by volume $N_2$;
    c. recovering from said column at an upper end thereof a hot outlet gas consisting essentially of 15 to 20 percent by volume carbon dioxide, 25 to 35 percent by volume carbon monoxide, 30 to 40 percent by volume hydrogen, up to 4 percent by volume methane and 3 to 15 percent by volume nitrogen, treating said outlet gas by washing and thereafter removing excess water from the washed gas to produce the partially dried gas, combining said partially dried gas with a quantity of methane strictly corresponding to the carbon dioxide and $H_2O$ of said partially dried gas, and reforming said gas mixture by passing same successively through a previously heated regenerator zone to raise the temperature thereof, through a nickel-catalyst zone adapted to produce a reformed gas mixture by converting substantially all but a maximum of 4 percent by volume methane of said gas mixture into carbon monoxide and hydrogen by reaction with the carbon dioxide and $H_2O$ of the gas mixture at a temperature of 700 to 900° C., and through a preheated regenerator zone whereby the reformed gas mixture emerges at a temperature of 800 to 850° C.;
    d. supplying the reformed gas mixture of step (c) to said column at the bottom thereof as the reducing gas of step (b); and
    e. recovering from said column sponge iron formed by reduction of the iron ore thereof and the major part of the coke added to said column with said charge.

2. A process as defined in claim 1 wherein the successive zones of step (c) are provided one beneath the other in each of two regenerator columns, said process further comprising the steps of f. heating one of said regenerator columns by burning at the base thereof a gaseous fuel with oxygen to produce a hot combustion gas induced to flow upwardly through the zones of said one of said generator columns during one phase of regenerator-column operation;

g. simultaneously with said one phase of said regenerator-column operation of said one of said regenerator columns, passing said resulting gas mixture of step (c) downwardly through the successive zones of the other regenerator column and interchanging the functions of said regenerator columns to heat said other regenerator column while said one regenerator column carries out step (c);

h. continuously supplying the reformed gas mixture to the reduction column in step (d); and i. treating the reformed gas mixture emerging from the last of said zones in step (d) with a burner supplied with methane and oxygen in the precise stoichiometric relationship necessary to produce hydrogen and carbon monoxide, thereby further raising the temperature of said reformed gas mixture prior to its admission to said reduction column in step (d).

3. An apparatus for the direct reduction of iron ore comprising:

a vertical reduction shaft furnace;

means for delivering to said furnace a charge consisting of iron ore and about 5 percent coke;

a pair of functionally interchangeable regenerator columns each having in vertical succession a first refractory-packed regenerative heating zone, a nickel-catalyst zone and a second refractory-packed regenerative heating zone;

respective first burner means at one end of each of said regenerator columns for burning a fuel-oxygen mixture and passing the resulting combustion products through said regenerator column in a first direction, thereby heating said zones;

second burner means at said end of said column for combustion of methane therein for admixture with a gas traversing the generator column in a direction opposite said first direction;

means for recovering from the upper end of said vertical shaft furnace nd an outlet gas containing water vapor, carbon dioxide, carbon monoxide, hydrogen, nitrogen and methane and including:

dust-removal means for abstracting particulate matter from the outlet gas, scrubbing means for washing said outlet gas with water, means for removing excess water from said outlet gas, and means for feeding the treated outlet gas through one of said regenerator columns in said opposite direction while the other of said regenerator columns is heated by said combustion products;

means for introducing the gas emerging at said one end of said one of said regenerator columns to said furnace at the bottom thereof; and an additional burner connected with the last-mentioned means for combustion of methane with oxygen in the precise stoichiometric ratio required for conversion of all of the combusted methane to hydrogen and carbon monoxide, thereby heating the gas admitted to said furnace.